15

US007559060B2

(12) United States Patent
Schmidt et al.

(10) Patent No.: US 7,559,060 B2
(45) Date of Patent: Jul. 7, 2009

(54) TIME-BOUNDED PROGRAM EXECUTION

(75) Inventors: Darren R. Schmidt, Cedar Park, TX (US); Aljosa Vrancic, Austin, TX (US); Satish V. Kumar, Austin, TX (US)

(73) Assignee: National Instruments Corporation, Austin, TX (US)

(*) Notice: Subject to any disclaimer, the term of this patent is extended or adjusted under 35 U.S.C. 154(b) by 992 days.

(21) Appl. No.: 10/784,866

(22) Filed: Feb. 23, 2004

(65) Prior Publication Data
US 2004/0255296 A1 Dec. 16, 2004

Related U.S. Application Data

(60) Provisional application No. 60/477,388, filed on Jun. 10, 2003.

(51) Int. Cl.
*G06F 9/46* (2006.01)
*G06F 9/44* (2006.01)
*G06F 11/00* (2006.01)

(52) U.S. Cl. .................. 718/100; 718/102; 718/104; 717/124; 717/127; 717/128; 717/129; 717/131; 714/2; 714/34; 714/48; 714/55

(58) Field of Classification Search ............ 718/1–108; 714/17, 34, 2, 15, 55, 48; 712/23, 234, 228; 717/174, 11, 168–178, 120–131
See application file for complete search history.

(56) References Cited

U.S. PATENT DOCUMENTS

| | | | | |
|---|---|---|---|---|
| 5,530,802 A | * | 6/1996 | Fuchs et al. ............... 714/17 |
| 5,944,778 A | * | 8/1999 | Takeuchi et al. ............ 718/100 |
| 6,014,669 A | * | 1/2000 | Slaughter et al. ............... 707/10 |
| 6,076,157 A | * | 6/2000 | Borkenhagen et al. ....... 712/228 |
| 6,161,193 A | * | 12/2000 | Garg et al. ..................... 714/6 |
| 6,185,577 B1 | * | 2/2001 | Nainani et al. .............. 707/202 |
| 6,189,022 B1 | * | 2/2001 | Binns .......................... 718/100 |

(Continued)

OTHER PUBLICATIONS

LabVIEW Real-Time Module User Manual; Apr. 2003.*

(Continued)

*Primary Examiner*—Van H Nguyen
*Assistant Examiner*—Abdullah Al Kawsar
(74) *Attorney, Agent, or Firm*—Meyertons Hood Kivlin Kowert & Goetzel, P.C.; Jeffrey C. Hood; Mark S. Williams

(57) ABSTRACT

System and method for performing time-bounded execution of a program. A timed program execution process is initiated, and a timeout process is initiated. A timeout condition is configured in the timeout process at a first priority level, and a rollback state determined for the program. Execution of the program is initiated in the timed program execution process at a second priority level below the first priority level. During execution of the program, the timeout process determines if the timeout condition has occurred, and if so, the timeout process restores the execution of the program to the rollback state, and the timed program execution process resumes execution of the program from the rollback state with the timeout condition. The program exits in the timed program execution process in response to the timeout condition, and the timeout event disabled. The timeout process is terminated, and the timed program execution process is terminated.

27 Claims, 13 Drawing Sheets

U.S. PATENT DOCUMENTS

| | | | |
|---|---|---|---|
| 6,230,181 B1* | 5/2001 | Mitchell et al. | 718/100 |
| 6,269,478 B1* | 7/2001 | Lautenbach-Lampe et al. | 717/127 |
| 6,438,749 B1* | 8/2002 | Chamberlain | 717/174 |
| 6,484,276 B1* | 11/2002 | Singh et al. | 714/41 |
| 6,584,601 B1* | 6/2003 | Kodosky et al. | 716/4 |
| 6,892,331 B2* | 5/2005 | Da Palma et al. | 714/55 |
| 7,039,012 B2* | 5/2006 | Nakano et al. | 370/230 |
| 7,043,728 B1* | 5/2006 | Galpin | 718/102 |
| 7,093,249 B2* | 8/2006 | Melamed et al. | 718/100 |
| 7,178,062 B1* | 2/2007 | Dice | 714/38 |
| 7,181,585 B2* | 2/2007 | Abrashkevich et al. | 711/170 |
| 7,406,688 B2* | 7/2008 | Shibayama et al. | 718/102 |
| 7,409,671 B1* | 8/2008 | Meredith et al. | 717/104 |
| 2003/0140334 A1* | 7/2003 | Granston et al. | 717/125 |
| 2004/0015924 A1 | 1/2004 | Hah et al. | |
| 2004/0064817 A1* | 4/2004 | Shibayama et al. | 718/104 |
| 2004/0158549 A1* | 8/2004 | Matena et al. | 707/1 |

OTHER PUBLICATIONS

"Timing a LabVIEW Operation"; Technical Note 022; Oct. 1992; 3 pages; National Instruments Corporation.

* cited by examiner

TIME-BOUNDED PROGRAM EXECUTION

PRIORITY DATA

This application claims benefit of priority to U.S. Provisional Patent Application Ser. No. 60/477,388 titled "Time-Bounded Program Execution" filed Jun. 10, 2003, and whose inventors were Darren R. Schmidt, Aljosa Vrancic, and Satish Kumar.

FIELD OF THE INVENTION

The present invention relates to real-time program execution, and more particularly to a system and method for time-bounded program execution.

DESCRIPTION OF THE RELATED ART

Many industrial systems require real-time operation, such as for example, automated manufacturing, control, and quality control, where an algorithm or operation (or set of operations) must be performed under strict time limitations for each of a series of items, e.g., on a moving assembly or manufacturing line. Increasingly, such operations are performed by computer-implemented systems where a computer system, in conjunction with various other devices such as cameras, motion control devices, and so forth, executes one or more programs to perform the operation(s).

Real-time systems often provide execution environments that facilitate deterministic program or algorithm performance, where in this context, the term "deterministic" refers to execution of the program (i.e., performance of the algorithm) in substantially constant time. In other words, a deterministic program may be expected to execute and return a result for any valid input set in substantially the same amount of time. The term "program" may refer to an entire application, or may refer to a portion of an application, such as a sub-routine, dynamic linked library, or any other set of program instructions executable to perform a function, operation, or task.

However, not all programs that execute on real-time systems are deterministic. In fact, most real-time programs are not deterministic due to a number of restrictions determinism entails or imposes. First and foremost, the program's resource needs during execution need to be known a priori. Otherwise, requests from the system for dynamically allocated resources may be made and resource contention cannot be ruled out. This requirement alone removes a large set of algorithms as candidates for deterministic execution. As noted above, another restriction imposed by determinism is that program execution should complete in substantially the same amount of time for all valid inputs. This is a significant hurdle to overcome for input domains that are multi-dimensional, because the sizes and number of the dimensions influence the execution time of the program. These factors force most deterministic algorithms to be iterative in nature, and may also restrict processing to small data sets or usually a single data point, resulting in what are referred to as point-by-point algorithms.

Because determinism generally imposes severe restrictions on program design and resource usage, it is generally impractical or impossible for most complex programs or algorithms to be converted to a form that executes deterministically. For example, in the field of vision algorithms, such as used in machine vision applications, virtually all programs operate on images containing two distinct dimensions of data that are spatially related. This interrelationship between dimensions makes the transition to an iterative form expensive in resource usage or computationally intensive. For example, consider blob analysis programs or algorithms designed to determine connected collections of pixels (blobs) having the same pixel value. While these algorithms iterate through the image sequentially, their execution time and storage are directly related to the number of blobs found in an input image. According to determinism requirements, execution time and resource usage should not vary over different valid inputs. Hence, these programs or algorithms are not suited for deterministic execution. Algorithms for pattern matching and edge detection have similar challenges that make determinism unfeasible.

Thus, improved systems and methods for time-bounded program execution are desired.

SUMMARY OF THE INVENTION

Various embodiments of the present invention provide for time-bounded execution of programs, such as in real-time applications. In one embodiment, a timeout condition may be set in a first process, e.g., a first thread. For example, a timeout event may be configured or set, such that the event will fire when a specified amount of time has elapsed. Execution of a program may be initiated in a second process, e.g., a second thread. It should be noted that in other embodiments, the second process may include two or more execution threads or processes (e.g., a plurality of second threads). Note that in some embodiments, execution of the program may include execution of a plurality of programs. For example, in one embodiment, the program may include one or more sub-programs, i.e., the program may comprise a set of programs.

During execution of the program, the first process may determine if the timeout condition has occurred, and if the timeout condition has not occurred, then the program may complete and exit normally. If the timeout condition does occur, the first process may restore the program to a pre-defined state in the program, referred to as the rollback state. In a preferred embodiment, the rollback state includes a rollback point in the program from which the program may exit normally, e.g., with a timeout condition.

Once the program has been restored to the pre-defined state, e.g., to the rollback state, the second process may execute the program from the rollback state with the error (timeout) condition. In other words, the second process (e.g., thread) may resume execution of the program from the rollback state. In a preferred embodiment, the program may resume execution from the rollback point.

Finally, the program may exit in the second process in response to the timeout condition, e.g., with an error code indicating that program execution was interrupted. In other words, the program did not complete execution before the timeout occurred, and so the program execution may be interrupted and reset for subsequent execution.

It should be noted that in preferred embodiments, the method described above may be performed iteratively, where, for example, each time-bounded program execution (whether timed-out or not) corresponds to one of a series of items, events, or processes, such as in an automated manufacturing or inspection system. For example, once the program has exited normally, the method may return to the set timeout condition step above, and continue as described, e.g., performing the time-bounded execution of the program in an iterative manner, e.g., executing the program for each of a plurality of items, e.g., objects on a conveyor belt, etc. Similarly, once the program has exited with the timeout condition, the method may proceed back to setting the timeout condition, and continue as described above.

In another embodiment of the present invention, a timed program execution process may be initiated, where the timed program execution process is operable to execute a program in a time-bounded manner. In a preferred embodiment, the timed program execution process comprises a first execution thread.

Then, a timeout process may be initiated. In one embodiment, the timeout process executes at a first priority level. In a preferred embodiment, the timeout process comprises a second execution thread. In one embodiment, initiating the timeout process may be performed by the timed program execution process.

A timeout event may then be configured or set. Note that the timeout event may be based on a timer, a signal from an external process, and/or any other type of event. For example, a control process or sensor on a conveyor belt or assembly line may send a signal indicating that a next item has arrived, and so indicate that the time period for processing the current item is over, and that the time period for processing the next item is to begin.

The timed program execution process may then perform a time-bounded execution of the program (or a plurality of programs). In one embodiment, the execution of the program may be performed at a second priority level, where the second priority level is below the first priority level. In other words, the process that executes the program preferably operates at a priority level below that of the timeout process, so that the timeout process can reliably preempt the execution process as necessary. A preferred embodiment of the program execution step is described below.

As noted above, in one embodiment, the method may execute a plurality of programs. For example, the time-bounded program execution may be performed in an iterative manner, where at each iteration a respective program is executed.

The timeout event may then be disabled, and the timeout process may be terminated. In other words, "cleanup operations" for the timeout process may be performed. In one embodiment, once the timeout event has been disabled, the method may return to setting the timeout event and may execute the program (or programs), proceeding as described above. In other words, the program or programs may be performed iteratively, where for each iteration the timeout event is set, the program executed, and the timeout disabled, e.g., for each of a plurality of items, e.g., on an assembly line or conveyor belt. Thus, each program (or set of programs) may be performed in a time-bounded manner a plurality of times. Finally, the timed program execution process may be terminated.

Thus, the timed program execution may be performed for each item in a series of items being processed or analyzed, e.g., items queued for processing on the assembly line or conveyor belt. A more detailed embodiment of the timed program execution step follows.

As described above, in one embodiment, an execution priority level of the timed program execution process may be set to a second priority level, where the second priority level is below the first priority level.

A rollback state in the program may be determined, which may include storing an execution state of the timed program execution process at a rollback point. In other words, the method may include storing state information for the process corresponding to the rollback point, such that the process may be "rolled back" to that point and execution resumed, as described below.

If the timeout event has not occurred, the program may be executed; otherwise, the method may exit. During program execution, if the timeout event occurs, the timeout process may restore the execution state of the timed program execution process to the rollback state (and disable the timeout event), and the timed program execution process may resume executing the program from the rollback state. As noted above, the rollback state may include a rollback point in the program, and so the second process may resume execution of the program from the rollback point.

Finally, a program exit procedure may be performed. In one embodiment, performing the program exit procedure may include clearing the rollback state, e.g., clearing the rollback point. In one embodiment, the program may exit with an error code indicating the timeout condition, as described above.

As noted above, in one embodiment, the method may include iteratively performing time-bounded execution of a plurality of programs. For example, in one embodiment, iteratively performing the time-bounded execution of a plurality of programs may include performing the method described above for each of the plurality of programs.

In one embodiment, performing the program exit procedure may also include: if the timeout event has occurred, storing an indication of a timeout condition, where the timed program execution process performing a time-bounded execution of the program includes performing the method above for each program only if the timeout condition is not indicated.

Thus, in a preferred embodiment, each of the methods described herein may be performed in an iterative manner, where each program (or each of a set of programs) is performed as described above for each of a plurality of items, processes, or events, such as, for example, items on an assembly line or conveyor belt. In an embodiment where the program includes one or more sub-programs, or where the program comprises a set of programs, executing the program may include performing the above steps for each of the one or more sub-programs or for each of the set of programs. In other words, the priority level set for the program may apply to each of the sub-programs or the set of programs.

In one embodiment, setting the execution priority level of the timed program execution process may include storing an original execution priority level of the timed program execution process prior to setting the execution priority level of the timed program execution process. In this embodiment, performing the program exit procedure may also include restoring the execution priority level of the timed program execution process to the original execution priority level.

In one embodiment, initiating the timeout process may include acquiring one or more resources for the time-bounded execution of the program, and initializing one or more resource managers for the one or more resources. Note that in some embodiments, the acquiring one or more resources may be performed before the initializing the one or more resources managers, while in other embodiments, the initializing the one or more resources managers may be performed first, and/or may include the acquiring. Terminating the timeout process may then include releasing the one or more resources for the time-bounded execution of the program, and un-initializing the one or more resource managers for the one or more resources. Note also that in some embodiments, the releasing one or more resources may be performed before the un-initializing the one or more resources managers, while in other embodiments, the un-initializing the one or more resources managers may be performed first, and/or may include the releasing.

In another embodiment, initiating the timeout process may further include enabling each of the one or more resource managers, and terminating the timeout process further may include disabling each of the one or more resource managers.

Note that the resources may include any type of resource used by the program and/or by the timed program execution process, and/or by the timeout process. For example, in one embodiment, the one or more resources include one or more memory pools for memory allocations during the time-bounded execution of the program. In one embodiment, prior to determining the rollback state (e.g., the rollback point) in the program a respective resource state for each of the one or more resources may be stored, and each of the one or more resource managers may be enabled. In this embodiment, performing the program exit procedure may include: if the timeout event has occurred, restoring the respective resource state for each of the one or more resources, and disabling each of the one or more resource managers.

BRIEF DESCRIPTION OF THE DRAWINGS

A better understanding of the present invention can be obtained when the following detailed description of the preferred embodiment is considered in conjunction with the following drawings, in which.

Figure 1A:
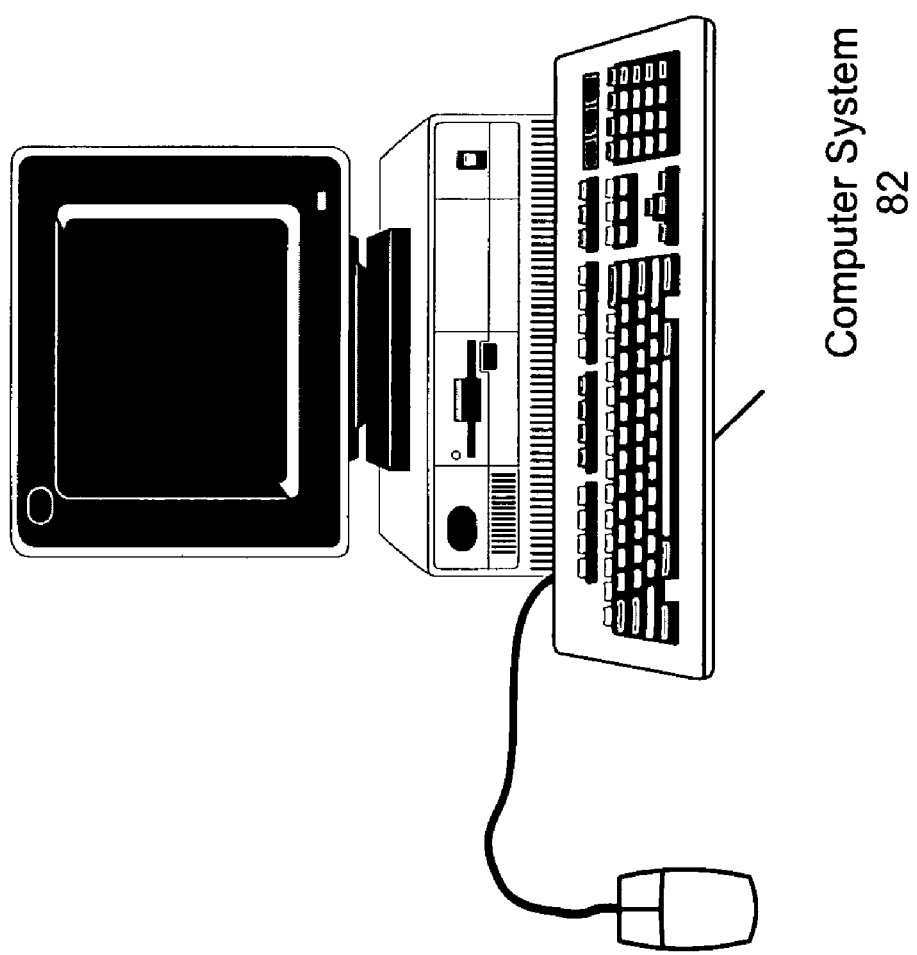
FIG. 1A illustrates a computer system operable to execute a program according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Incorporation by Reference

The following references are hereby incorporated by reference in their entirety as though fully and completely set forth herein:

U.S. Provisional Patent Application Ser. No. 60/477,388 titled "Time-Bounded Program Execution" filed Jun. 10, 2003, and whose inventors were Darren R. Schmidt, Aljosa Vrancic and Satish Kumar.

U.S. Pat. No. 4,914,568 titled "Graphical System for Modeling a Process and Associated Method," issued on Apr. 3, 1990.

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

Terms

The following is a glossary of terms used in the present application:

Deterministic Program—Determinism or a deterministic program relates to execution time of a program, not reproducible results. A deterministic program completes execution in a predictable and repeatable amount of time for any valid input set.

Jitter—The maximum variance in execution time from one run of the program to the next. Smaller jitter represents a more deterministic behavior.

Resource Contention—Also referred to as a resource conflict, in a (real-time) system refers to two or more processes demanding access to the same resource at overlapping time intervals. For example, a common resource contention occurs when two processes request memory from the system's memory manager. Only one process is allowed access at a time and so the other is forced to wait, possibly resulting in unpredictable behavior in execution that may prevent deterministic execution.

Point-By-Point Algorithms—typically iterative algorithms that have been redesigned for a real-time system to perform one iteration per execution. This may require the program to maintain state information so that the following iteration starts from where the prior iteration left off.

Time-Bounded Program—a program that obeys a time limit t by completing execution with a result within time t or exiting with an error in time t+dt where dt is the acceptable jitter for the program.

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as signals such as electrical, electromagnetic, or digital signals, conveyed via a communication medium such as a bus, network and/or a wireless link.

Programmable Hardware Element—includes various types of programmable hardware, reconfigurable hardware, programmable logic, or field-programmable devices (FPDs), such as one or more FPGAs (Field Programmable Gate Arrays), or one or more PLDs (Programmable Logic Devices), such as one or more Simple PLDs (SPLDs) or one or more Complex PLDs (CPLDs), or other types of programmable hardware. A programmable hardware element may also be referred to as "reconfigurable logic".

Medium—includes one or more of a memory medium, carrier medium, and/or programmable hardware element; encompasses various types of mediums that can either store program instructions/data structures or can be configured with a hardware configuration program.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Node—In the context of a graphical program, an element that may be included in a graphical program. A node may have an associated icon that represents the node in the graphical program, as well as underlying code or data that implements functionality of the node. Exemplary nodes include function nodes, terminal nodes, structure nodes, etc. Nodes may be connected together in a graphical program by connection icons or wires.

Data Flow Graphical Program (or Data Flow Diagram)—A graphical program or diagram comprising a plurality of interconnected nodes, wherein the connections between the nodes indicate that data produced by one node is used by another node.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

FIG. 1A—Computer System

FIG. 1A illustrates a computer system 82 operable to execute a program configured to execute in a time-bounded manner. One embodiment of a method for time-bounded program execution is described below.

As shown in FIG. 1A, the computer system 82 may include a display device operable to display the program as the program is created and/or executed. The display device may also be operable to display a graphical user interface or front panel of the program during execution of the program. The graphical user interface may comprise any type of graphical user interface, e.g., depending on the computing platform.

The computer system 82 may include a memory medium(s) on which one or more computer programs or software components according to one embodiment of the present invention may be stored. For example, the memory medium may store one or more programs which are executable to perform the methods described herein. Also, the memory medium may store a programming development environment application used to create and/or execute such programs. The memory medium may also store operating system software, as well as other software for operation of the computer system. Various embodiments further include receiving or storing instructions and/or data implemented in accordance with the foregoing description upon a carrier medium.

Figure 1B:
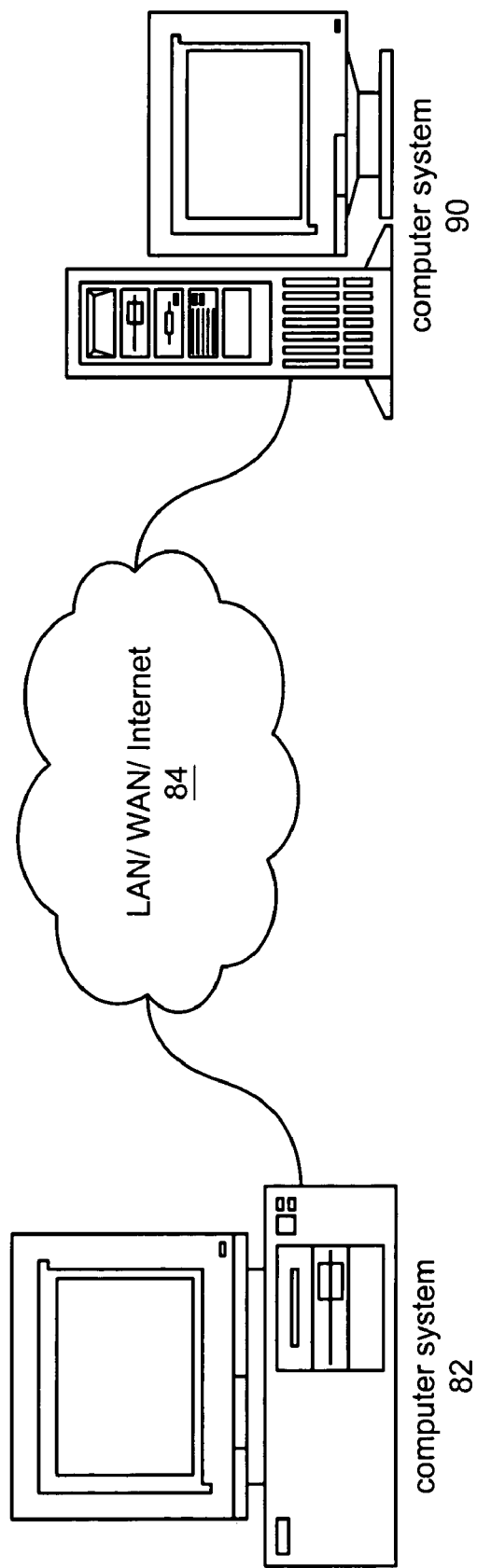
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be connected through a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a program in a distributed fashion. For example, computer 82 may execute a first portion of the program and computer system 90 may execute a second portion of the program. As another example, computer 82 may display the graphical user interface of a program and computer system 90 may execute the remainder of the program.

In one embodiment, the graphical user interface of the program may be displayed on a display device of the computer system 82, and the program may execute on a device 190 connected to the computer system 82. The device 190 may include a programmable hardware element and/or may include a processor and memory medium which may execute a real time operating system. In one embodiment, the program may be downloaded and executed on the device 190. For example, an application development environment with which the program is associated may provide support for downloading a program for execution on the device in a real time system.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested; data analysis, such as numerical analysis, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
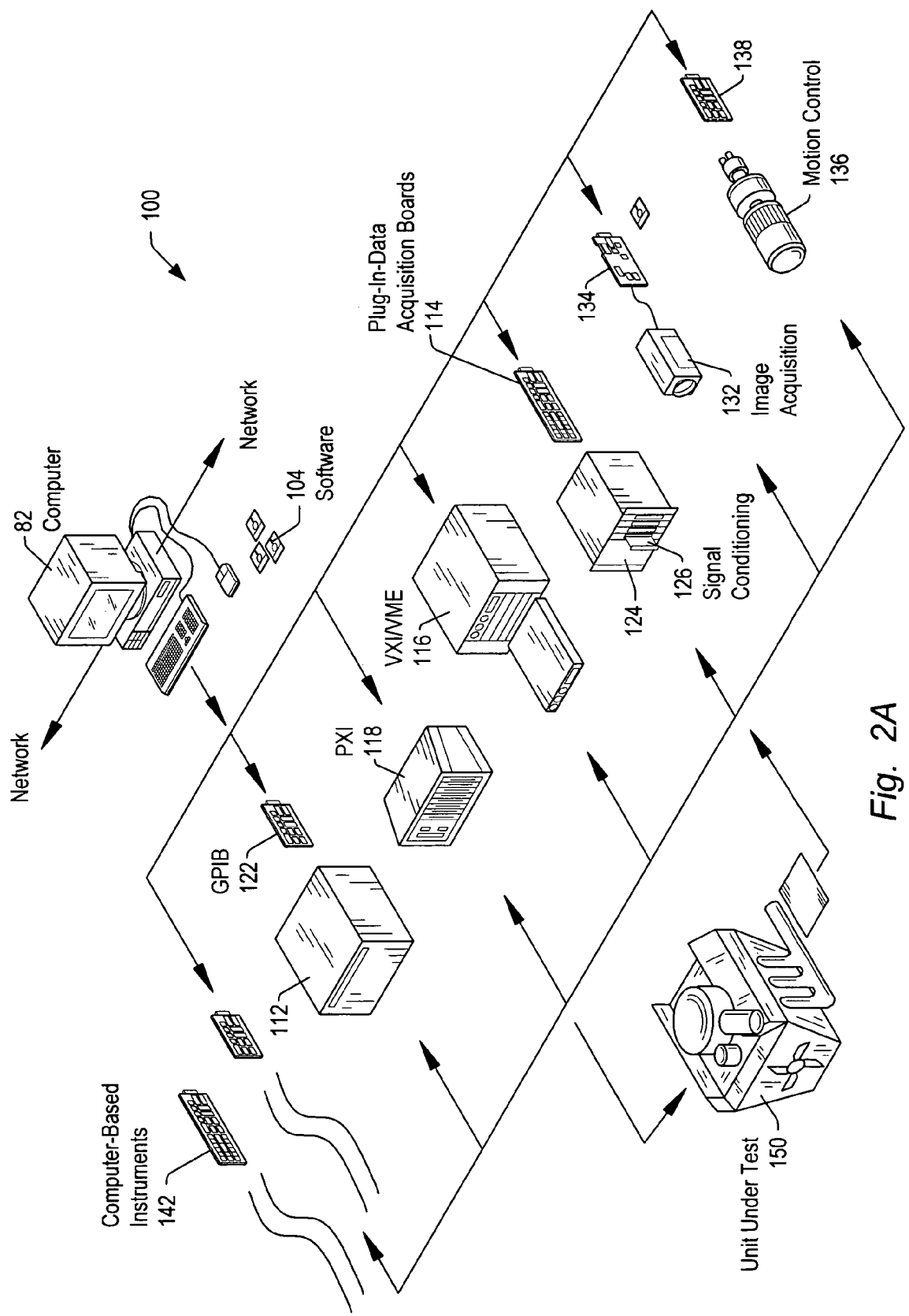
FIG. 2A illustrates an instrumentation control system according to one embodiment of the invention.

FIG. 2A illustrates an exemplary instrumentation control system 100 which may implement embodiments of the invention. The system 100 comprises a host computer 82 which connects to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to a unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, and a data analysis application, among others.

Figure 2B:
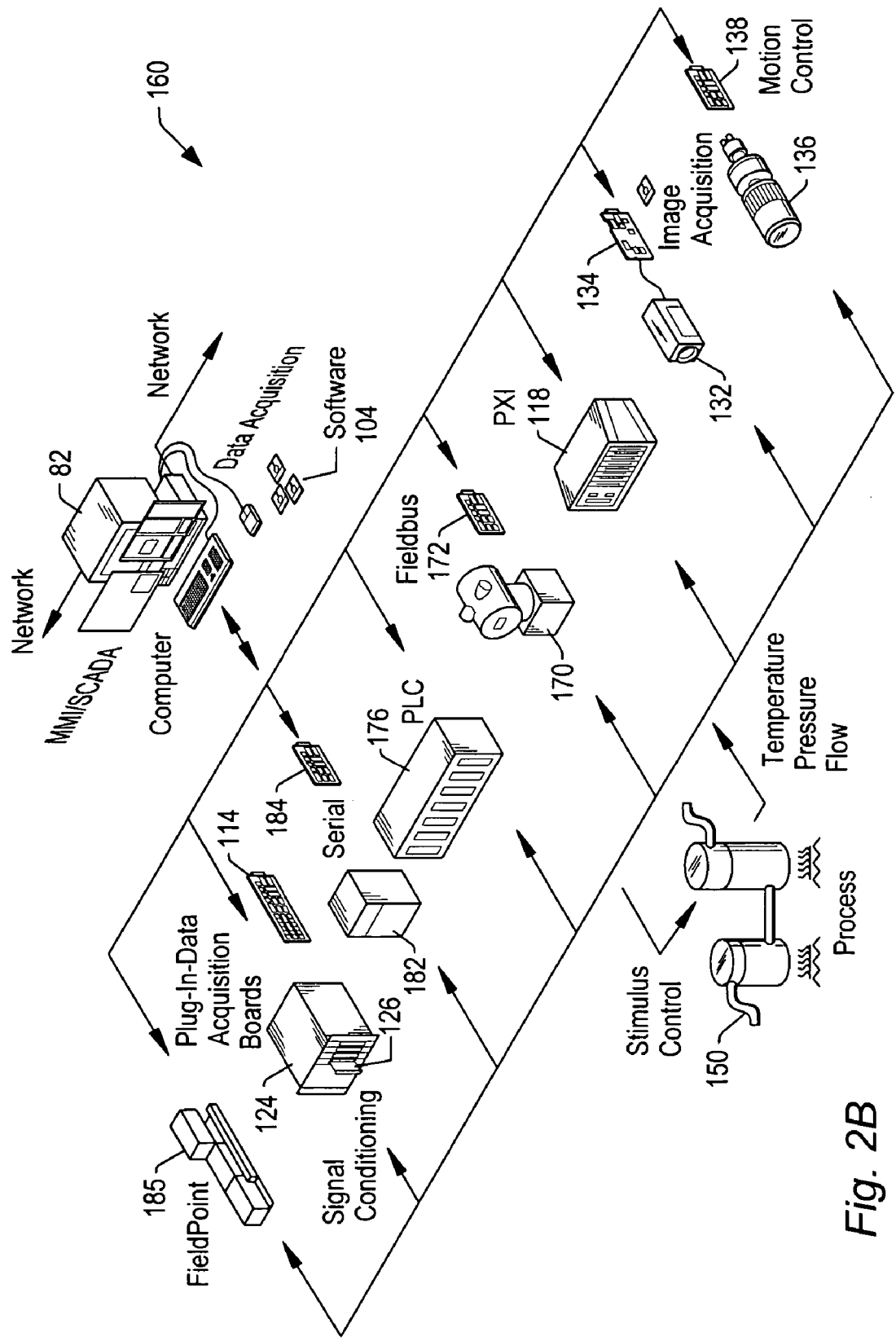
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which connects to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 and associated signal conditioning circuitry 124, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3A:
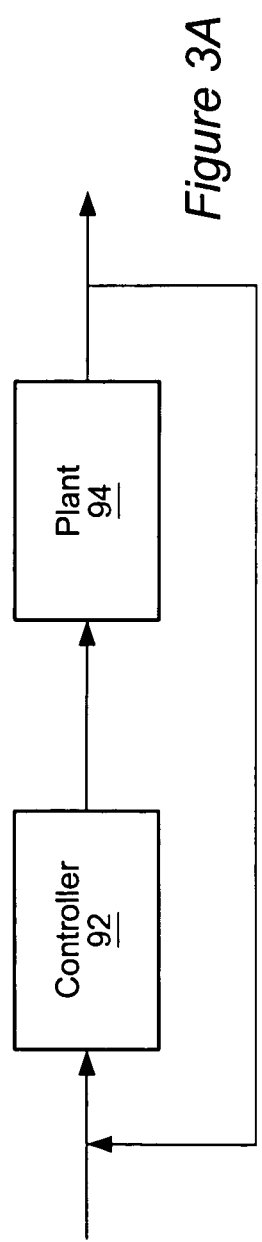
FIG. 3A is a high level block diagram of an exemplary system which may execute or utilize programs according to the present invention.

FIG. 3A is a high level block diagram of an exemplary system which may execute or utilize programs according to embodiments of the present invention. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a program that specifies or implements the functionality of one or both of the controller 92 and the plant 94. For example, a control engineer may use a modeling and simulation tool to create a model (program) of the plant 94 and/or to create the algorithm (program) for the controller 92.

Figure 3B:
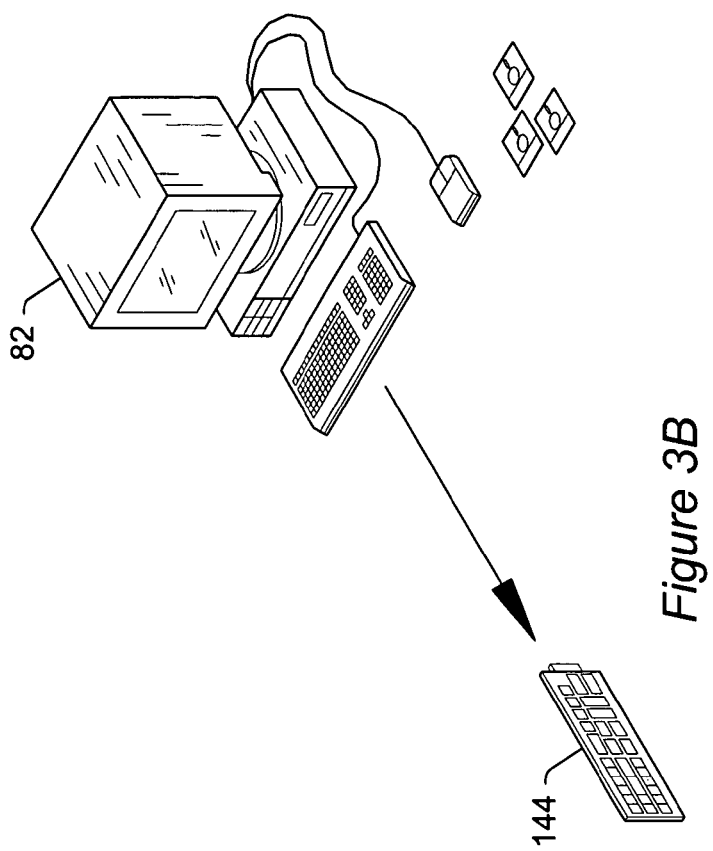
FIG. 3B illustrates an exemplary system which may perform control and/or simulation functions utilizing programs according to the present invention.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a program. In a similar manner, the plant 94 may be implemented by a computer system or other device 144 (e.g., including a processor and memory medium and/or including a programmable hardware element) that executes or implements a program, or may be implemented a real physical system, e.g., a car engine.

In one embodiment of the invention, one or more programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a program, and the program may execute on the controller 92, e.g., on a computer system or other device. The computer system 82 may be a platform that supports real time execution, e.g., a device including a processor that executes a RTOS, or a device including a programmable hardware element.

In one embodiment of the invention, one or more programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a program) is executed in real time to make the real controller 92 "believe" or operate as if it is connected to a real plant, e.g., a real engine.

In the embodiments of FIGS. 2A, 2B, 3B, and 4 above, one or more of the various devices may couple to each other over a network, such as the Internet. In one embodiment, the user operates to select a target device from a plurality of possible target devices for programming or configuration using a program. Thus the user may create a program on a computer and use (execute) the program on that computer or deploy the program to a target device (for remote execution on the target device) that is remotely located from the computer and coupled to the computer through a network.

Software programs which perform data acquisition, analysis and/or presentation, e.g., for measurement, instrumentation control, industrial automation, modeling, or simulation, such as in the applications shown in FIGS. 2A and 2B, may be referred to as virtual instruments. In one embodiment, the programs described herein may be graphical programs, such as those developed in the LabVIEW graphical program development environment. Other graphical programs and graphical program development environments are also contemplated.

Figure 4:
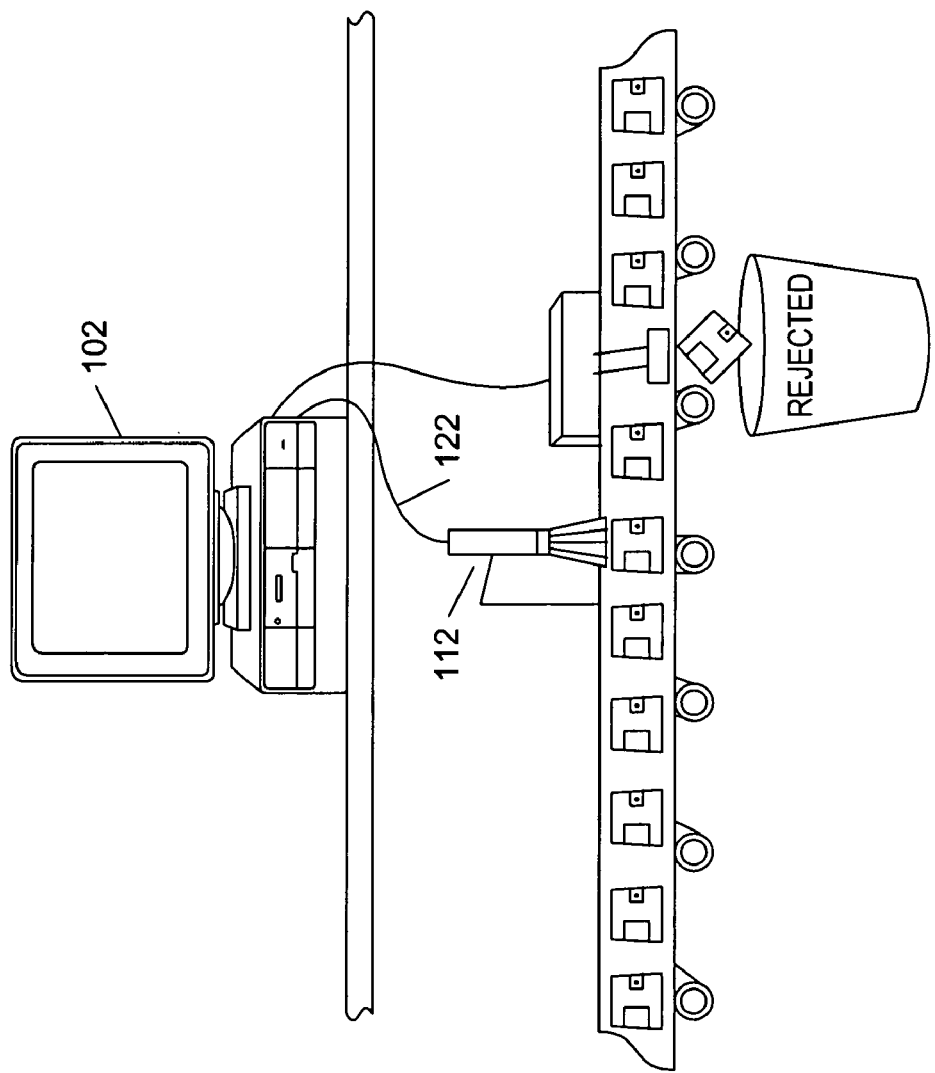
FIG. 4 illustrates a machine vision system in an automated manufacturing application, according to one embodiment.

FIG. 4—Machine Vision System for Automated Manufacturing

FIG. 4 illustrates a machine vision system or image acquisition system, which is an example of one application of the present invention. The time-bounded program execution techniques described herein may be used in various types of machine vision or motion control applications. For example, the computer 102 may be embodied in various form factors and/or architectures, e.g., a robot or embedded device, among others. It is also noted that the time-bounded program execution techniques described herein may be performed in any of various manners, either in software, programmable logic, or hardware, or a combination thereof.

In the machine vision system of FIG. 4, computer system 102 is coupled to a camera 112 via bus 122 and operates to receive one or more images, e.g., of items to be inspected. The computer system 102 may be operable to perform various machine vision tasks, e.g., pattern characterization or matching programs, to analyze the images, e.g., for quality control. In the example illustrates in FIG. 4, if the analysis determines that an item does not meet specified quality standards, the item may be discarded.

There may be restrictions on the time allowed per item for performance of the tasks, and so time-bounded execution of the task programs may be enforced in accordance with embodiments of the present invention. In other words, embodiments of the present invention may be used to limit the time spent performing the tasks per item to some specified duration. For example, in one embodiment, if the time spent performing the tasks on a given item meets or exceeds the specified duration, the item may be marked or removed for further processing and analysis, and the next item considered. In this way, the item that failed the time-bounded limitation may receive further processing or analysis as needed, e.g., offline, while processing of subsequent items in the queue (on the assembly or inspection line) continues without delay or interruption. Further details of time-bounded execution are provided below.

Figure 5:
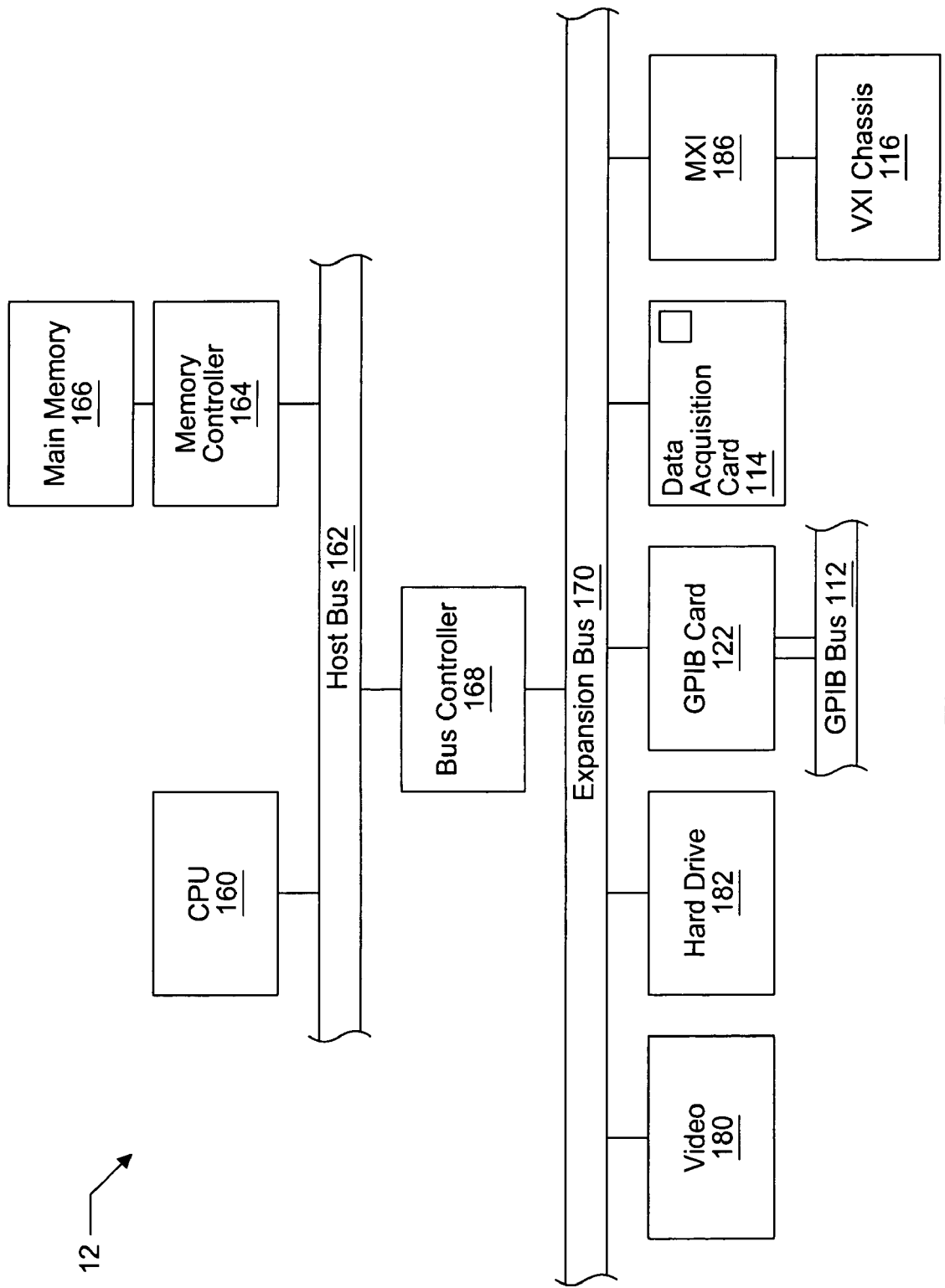
FIG. 5 is an exemplary block diagram of the computer systems of FIGS. 1A, 1B, 2A, 2B, 3B, and 4.

FIG. 5—Computer System Block Diagram

FIG. 5 is a block diagram representing one embodiment of the computer system 82 and/or 90 illustrated in FIGS. 1A and 1B, or computer system 82 shown in FIGS. 2A or 2B. It is noted that any type of computer system configuration or architecture can be used as desired, and FIG. 5 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store software instructions which are operable to execute a program in a time-bounded manner, and may also store the program. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. The computer system may be operable to deploy a program to the device 190 for execution of the program on the device 190. The deployed program may take the form of graphical program instructions or data structures that directly represent the program functionality. Alternatively, the deployed program may take the form of text code (e.g., C code) generated from a graphical program. As another example, the deployed program may take the form of compiled code generated from the program.

Time-Bounded Program Execution

Overview

Of the restrictions imposed by determinism, the upper limit on execution time is extremely valuable and provides the time behavior desired for many domains of operations. While determinism demands that a result is generated in a certain time frame, time-bounded execution requires a result or a timeout error within a specified time. In other words, time-bounded execution does not require the program to complete the computation in the time allotted. With the proper timing environment, almost any complex program or algorithm can adhere to a time limit while avoiding substantial program or algorithm changes.

Supporting Time-Bounded Execution:

One method for facilitating time-bounded execution requires every program to repeatedly check against a time limit via a recognized timer and to exit when the time limit is reached. While this method uses simple timing components, every program must typically be altered to be aware of the time limit by adding timing checks throughout the program code. The placement of these checks may be difficult to determine and the checks themselves will typically alter the timing behavior of the program. In addition, the jitter based on these time checks may vary dramatically from system to system because the execution of the code between time checks may vary substantially.

A second approach to time-bounded program execution involves creating or establishing a timed program execution environment in which programs are unaware of the timing mechanism. For this approach, three primary components may be needed: a mechanism capable of enforcing a time limit, resource management tools that avoid system requests during timed execution, and 'time-aware' program interfaces and utilities. These components may be deployed on a real-time system to facilitate appropriate time-critical behavior and to guarantee special control over resources at run-time. While this approach is may be more difficult to design and implement than that described above, it may result in minimal jitter during execution on any target, and avoids intrusive changes to complex programs or algorithms.

Foundation of the Timed Environment:

The mechanism enforcing the time limit preferably satisfies the following requirements:

1) It preferably times events at significantly high resolution (preferably microseconds) to support the required jitter response for a program.

2) It preferably runs at a process priority allowing it to react immediately when a time has expired.

3) It is preferably capable of 'stopping' program execution at any point along the program's execution path.

For example, the current timeout mechanism in National Instruments Corporation's LabVIEW RT uses the high-resolution timer capabilities provided on the Pentium III-class Intel processors and above (but is not limited to this mechanism). Since LabVIEW RT supports time-critical execution threads, the mechanism runs at time-critical (highest level) priority so that nothing prevents it from reacting to a timeout condition substantially immediately. The capability or means to stop the program execution is described in more detail below.

In a preferred embodiment, two or more threads (or other concurrent process mechanisms) may be used to implement time-bounded program execution, also described below.

In a real-time system, typically only one time-critical process can run at a time. To maintain control of the processor(s), a time-critical process generally avoids going to sleep or requesting resources from the system. In a multi-threaded real-time system, such as LabVIEW RT, the timeout mechanism preferably runs at time-critical priority in its own thread. In one embodiment, when a time limit is started, the mechanism may start an event lasting for the time requested allowing other processes to run. In one embodiment, this is a microsecond event wrapper as is used in some operating systems. This event may be set by an external signal such as an interrupt, which may be invoked by a timer, by an external signal, etc. When the event is triggered, the timeout mechanism may acquire control of the processor from the program(s), change the state of the thread in which the interrupted program was executing to a stop state, and go idle, relinquishing control of the processor to the program's thread. The program may then continue from a different execution point that facilitates exiting the operation quickly with a timeout error.

This altering of execution points by the timeout mechanism along with the need to run at time-critical may require the programs to use special resource management tools to avoid requesting resources during timed execution. Any resource request, including memory allocations, may thus be filled from a pre-allocated source once a time limit is active and resources are being requested or the timed execution may be invalid (as is the case for deterministic execution). Thus, for example, a memory pool mechanism may be instantiated or allocated prior to starting a time-bounded execution to manage memory usage. Once the timeout mechanism is enabled, a memory pool manager providing deterministic memory operations may service memory requests.

As noted above, when a timeout occurs, the timeout mechanism preferably regains control of the processor and changes the execution state of the program it interrupted so that the program may exit with a timeout error when it resumes. This may be achieved by restoring the state of the thread in which the program runs to a rollback state where the program can safely exit with a timeout condition or error. In one embodiment, the rollback state may include a point in the program from which the program may exit gracefully with the timeout condition. This point may be referred to as a rollback point and the restoration of the thread state to one of these points may be referred to as a rollback. Thus, the rollback state preferably includes a rollback point, comprising an execution point in the program, and an execution state of the timed program execution process at the rollback point.

This type of mechanism is similar to the throw-catch model supported in C++ programming, but with some very important differences. First, whereas in C++, the exception is typically caught in the same thread from which it is thrown, in the approach of the present invention, the exception is caught in a different thread from where it was generated. Because of this, the execution stack cannot be used to cleanup (e.g., release or de-allocate) resources used by the program. Herein lies another requirement for resource managers during timed execution. If all intermediate resources used by the program are managed specially, the state of system resources may always be valid even when rollbacks occur.

To support timed execution, programs are preferably aware of the timeout mechanism and resource managers and use them accordingly. For example, the determination of at least one rollback point (as part of the rollback state) is generally required at the start of a program so that the program can be interrupted during execution. Once a rollback occurs, the program preferably avoids system resource requests by using resource managers, which may be enabled before the first rollback point (the rollback state) is established. From an execution standpoint, the program may typically need to run at a priority just below that of the timeout mechanism, allowing the program to run at time-critical priority while the timeout mechanism is "asleep", but allowing the program to be interrupted by the timeout mechanism when the timeout mechanism wakes up. Running at time-critical priority may be important, in that otherwise the program can be interrupted by another process running on the system. Likewise, the program preferably cannot go to sleep or another process will take over.

Figure 6A:
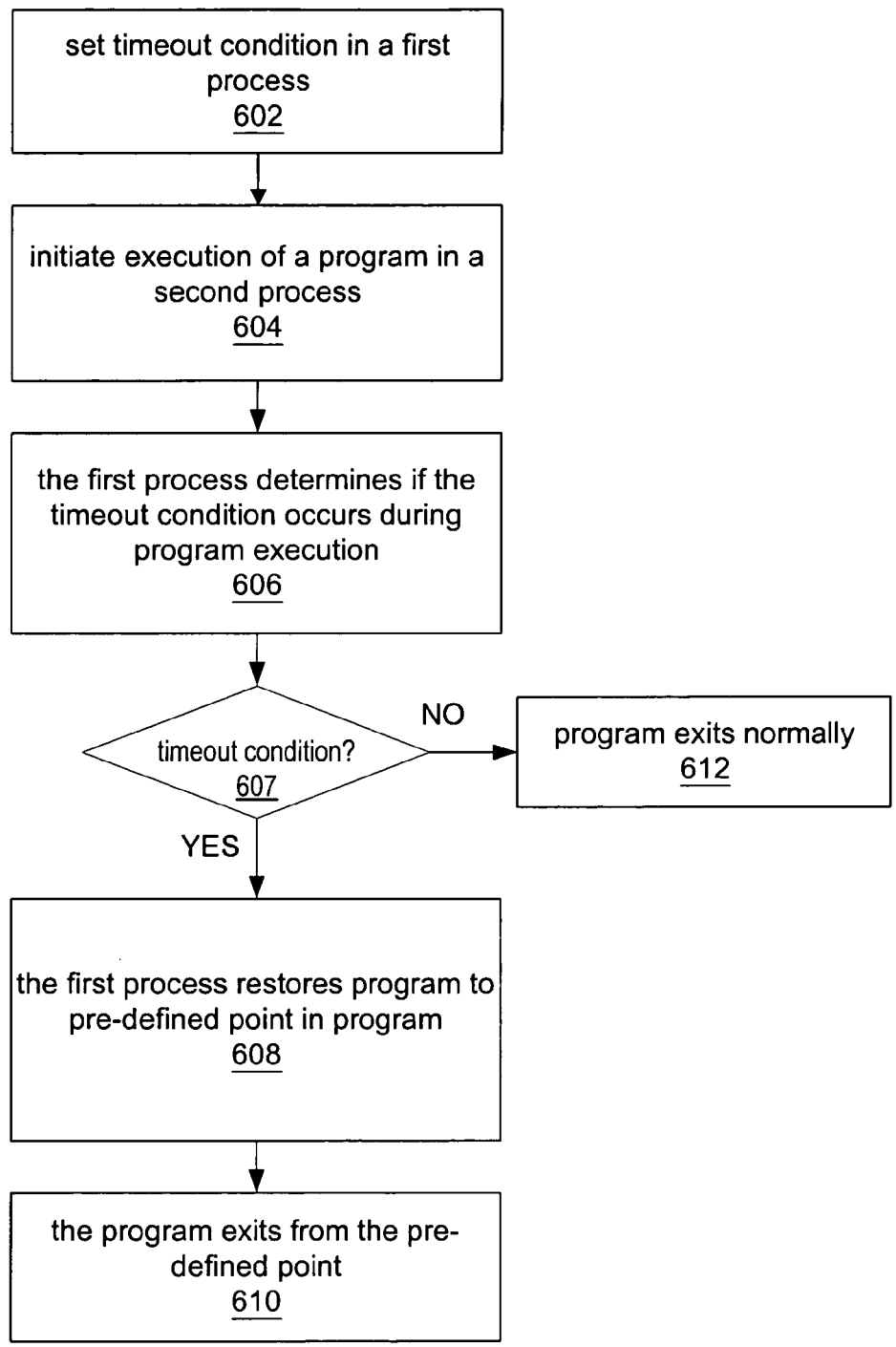
FIGS. 6A-6C are flowchart diagrams illustrating various embodiments of a method for time-bounded execution of a program.

FIG. 6A—Method for Time-Bounded Program Execution

FIG. 6A is a high level flowchart of a method for time-bounded program execution, according to one embodiment. It should be noted that in various embodiments, some of the steps may be performed concurrently, in a different order than shown, or may be omitted. Additional steps may also be performed as desired.

As FIG. 6A shows, in 602, a timeout condition may be set in a first process, e.g., a first thread. For example, a timeout event may be set, such that the event will fire when a specified amount of time has elapsed.

In 604, execution of a program may be initiated in a second process, e.g., a second thread. It should be noted that in other embodiments, the second process may include two or more execution threads or processes (e.g., a plurality of second threads). Note that in some embodiments, execution of the program may include execution of a plurality of programs. For example, in one embodiment, the program may include one or more sub-programs, i.e., the program may be a set of programs.

In 606, during execution of the program, the first process may determine if the timeout condition has occurred, and, as indicated in 607, if the timeout condition has not occurred, then the program may complete and exit normally, as shown in 608.

If the timeout condition does occur, then in 610, the first process may restore the program to a pre-defined state in the program, referred to as the rollback state, as noted above. As noted above, in a preferred embodiment, the rollback state includes a rollback point in the program from which the program may exit normally, e.g., with a timeout condition.

Once the program has been restored to the pre-defined state, e.g., to the rollback state, then in 612, the second process may execute the program from the rollback state with the error condition. In other words, the second process (e.g., thread) may resume execution of the program from the rollback state. In a preferred embodiment, the program may resume execution from the rollback point.

Finally, in 614, the program may exit in the second process in response to the timeout condition, e.g., with an error code indicating that program execution was interrupted. In other words, the program did not complete execution before the timeout occurred, and so the program execution may be interrupted and reset for subsequent execution.

It should be noted that in preferred embodiments, the method of FIG. 6A is performed iteratively, where, for example, each time-bounded program execution (whether timed-out or not) corresponds to one of a series of items, events, or processes, such as in an automated manufacturing or inspection system. For example, as FIG. 6A shows, once the program has exited normally in 608, the method may proceed to 602, and continue as described above, e.g., performing the time-bounded execution of the program in an iterative manner, e.g., executing the program for each of a plurality of items, e.g., objects on a conveyor belt, etc. Similarly, as also shown in FIG. 6A, once the program has exited with the timeout condition in 614, the method may proceed to 602, and continue as described above.

Figure 6B:
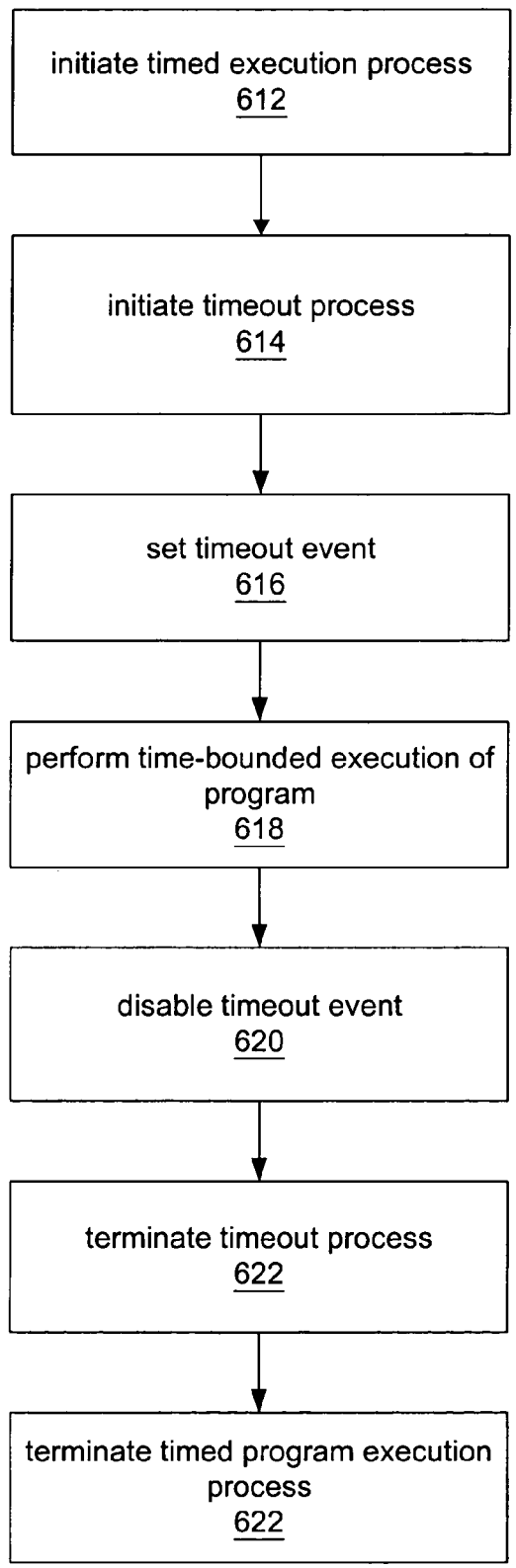

FIG. 6B—Detailed Method for Time-Bounded Program Execution

FIG. 6B is a more detailed flowchart of a method for time-bounded program execution. It should be noted that in various embodiments, some of the steps may be performed concurrently, in a different order than shown, or may be omitted. Additional steps may also be performed as desired.

As FIG. 6B shows, in 622, a timed program execution process may be initiated, where the timed program execution process is operable to execute a program in a time-bounded manner. In a preferred embodiment, the timed program execution process comprises a first execution thread.

Then, in 624, a timeout process may be initiated. In one embodiment, the timeout process executes at a first priority level. In a preferred embodiment, the timeout process comprises a second execution thread. In one embodiment, initiating the timeout process may be performed by the timed program execution process.

In 626 a timeout event may be set. Note that the timeout event may be based on a timer, a signal from an external process, and/or any other type of event. For example, a control process or sensor on a conveyor belt or assembly line may send a signal indicating that a next item has arrived, and so indicate that the time period for processing the current item is over, and that the time period for processing the next item is to begin.

In 628, the timed program execution process may perform a time-bounded execution of the program (or a plurality of programs). In one embodiment, the execution of the program may be performed at a second priority level, where the second priority level is below the first priority level. In other words, the process that executes the program preferably operates at a priority level below that of the timeout process, so that the timeout process can reliably preempt the execution process as necessary. A preferred embodiment of 628 is described below with reference to FIG. 6C.

As noted above, in one embodiment, the method may execute a plurality of programs. For example, as FIG. 6B indicates, the time-bounded program execution may be performed in an iterative manner, where at each iteration a respective program is executed.

In 630, the timeout event may be disabled, and in 632, the timeout process may be terminated. In other words, "cleanup operations" for the timeout process may be performed. As FIG. 6B also indicates, in one embodiment, once the timeout event has been disabled in 630, the method may return to 626, setting the timeout event and executing the program (or programs) (time-bounded), and proceeding as described above. In other words, the program or programs may be performed iteratively, where for each iteration the timeout event is set, the program executed, and the timeout disabled, e.g., for each of a plurality of items, e.g., on an assembly line or conveyor belt. Thus, each program (or set of programs) may be performed in a time-bounded manner a plurality of times.

Finally, in 634, the timed program execution process may be terminated.

Thus, the timed program execution may be performed for each item in a series of items being processed or analyzed, e.g., items queued for processing on the assembly line or conveyor belt. A more detailed embodiment of the timed program execution of step 618 is described below with reference to FIG. 6C.

Figure 6C:
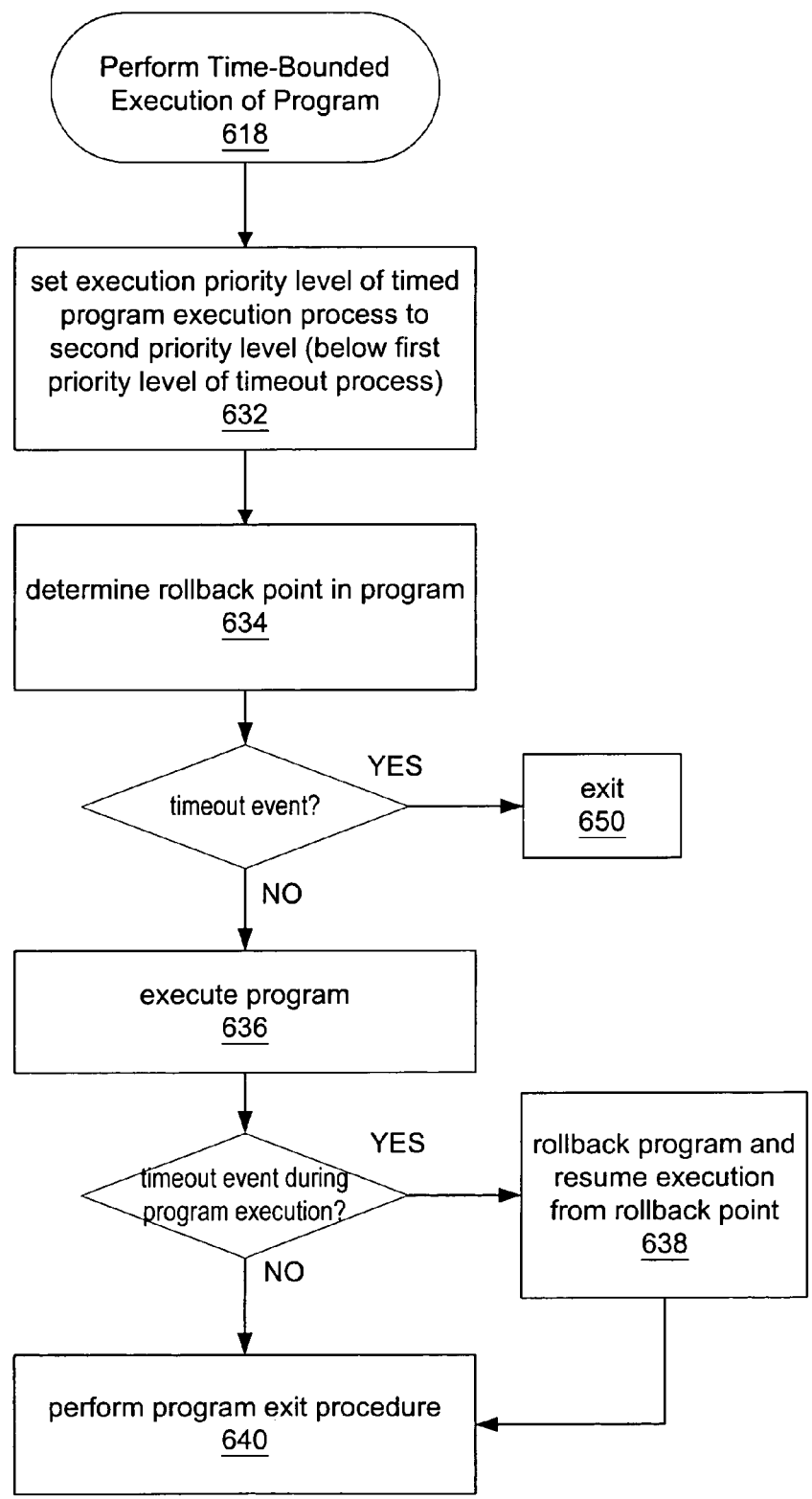

FIG. 6C—Time-Bounded Execution of the Program

FIG. 6C is a more detailed flowchart of one embodiment of step 628 of the method of FIG. 6B. It should be noted that in various embodiments, some of the steps may be performed concurrently, in a different order than shown, or may be omitted. Additional steps may also be performed as desired.

As FIG. 6C shows, in this embodiment, in 632, an execution priority level of the timed program execution process may be set to a second priority level, where the second priority level is below the first priority level, as described above.

In 634, a rollback state in the program may be determined, which may include storing an execution state of the timed program execution process at a rollback point. In other words, the method may include storing state information for the process corresponding to the rollback point, such that the process may be "rolled back" to that point and execution resumed, as described below.

In 636, if the timeout event has not occurred, the program may be executed; otherwise, the method may exit, as indicated in 650.

In 638, during program execution, if the timeout event occurs, the timeout process may restore the execution state of the timed program execution process to the rollback state (and disable the timeout event), and the timed program execution process may resume executing the program from the rollback state. As noted above, the rollback state may include a rollback point in the program, and so the second process may resume execution of the program from the rollback point.

Finally, in 640, a program exit procedure may be performed. In one embodiment, performing the program exit procedure may include clearing the rollback state, e.g., clearing the rollback point. In one embodiment, the program may exit with an error code indicating the timeout condition, as described above.

As noted above, in one embodiment, the method may include iteratively performing time-bounded execution of a plurality of programs. For example, in one embodiment, iteratively performing the time-bounded execution of a plurality of programs may include performing the method of FIG. 6C for each of the plurality of programs.

In one embodiment, performing the program exit procedure may also include: if the timeout event has occurred, storing an indication of a timeout condition, where the timed program execution process performing a time-bounded execution of the program includes performing the method of FIG. 6C for each program only if the timeout condition is not indicated.

Thus, in a preferred embodiment, each of the methods described herein may be performed in an iterative manner, where each program (or each of a set of programs) is performed as described above for each of a plurality of items, processes, or events, such as, for example, items on an assembly line or conveyor belt.

In an embodiment where the program includes one or more sub-programs, or where the program comprises a set of programs, executing the program in 636 may include performing steps 634 through 640 for each of the one or more sub-programs or for each of the set of programs. In other words, the priority level set in 632 may apply to each of the sub-programs or the set of programs.

In one embodiment, setting the execution priority level of the timed program execution process may include storing an original execution priority level of the timed program execution process prior to setting the execution priority level of the timed program execution process. In this embodiment, performing the program exit procedure may also include restoring the execution priority level of the timed program execution process to the original execution priority level.

In one embodiment, initiating the timeout process may include acquiring one or more resources for the time-bounded execution of the program, and initializing one or more resource managers for the one or more resources. Note that in some embodiments, the acquiring one or more resources may be performed before the initializing the one or more resources managers, while in other embodiments, the initializing the one or more resources managers may be performed first, and/or may include the acquiring. Terminating the timeout process may then include releasing the one or more resources for the time-bounded execution of the program, and un-initializing the one or more resource managers for the one or more resources. Note also that in some embodiments, the releasing one or more resources may be performed before the un-initializing the one or more resources managers, while in other embodiments, the un-initializing the one or more resources managers may be performed first, and/or may include the releasing.

In another embodiment, initiating the timeout process may further include enabling each of the one or more resource managers, and terminating the timeout process further may include disabling each of the one or more resource managers.

Note that the resources may include any type of resource used by the program and/or by the timed program execution process, and/or by the timeout process. For example, in one embodiment, the one or more resources include one or more memory pools for memory allocations during the time-bounded execution of the program.

In one embodiment, prior to determining the rollback state (e.g., the rollback point) in the program a respective resource state for each of the one or more resources may be stored, and each of the one or more resource managers may be enabled. In this embodiment, performing the program exit procedure may include: if the timeout event has occurred, restoring the respective resource state for each of the one or more resources, and disabling each of the one or more resource managers.

Enabling and Disabling the Rollback

During program execution, there may be some program states that are unstable, e.g., during certain system calls or processes, and during which it may not be safe to perform a rollback. For example, interrupting a memory allocation may leave the resource manager in an unknown state. Thus, in one embodiment, the rollback mechanism may have a disabled state to avoid rolling back to an unstable process state. For this reason, the rollback mechanism may be disabled during portions of fundamental resource operations, or other operations that involve an unstable process state.

For example, in one embodiment, performing time-bounded execution of the program (step 618 of FIG. 6B) may include receiving a disable request from the program to disable the rollback state, and disabling the rollback state in response to said disable request. The program may then continuing execution, e.g., performing a memory allocation, etc., while the rollback state is disabled. An enable request may then be received from the program to enable the rollback state, e.g., once the memory allocation is done, and the rollback state enabled in response to the enable request. The rollback state for the program may then be updated. In one embodiment, enabling the rollback state may include checking to see if a timeout event occurred while disabled, and performing a rollback if it did. In another embodiment, this check may be performed as a part of the rollback update. Note that this type of protection against rolling back to an unstable state is necessary for any system calls that degrade the process state if stopped prematurely.

Figure 7:
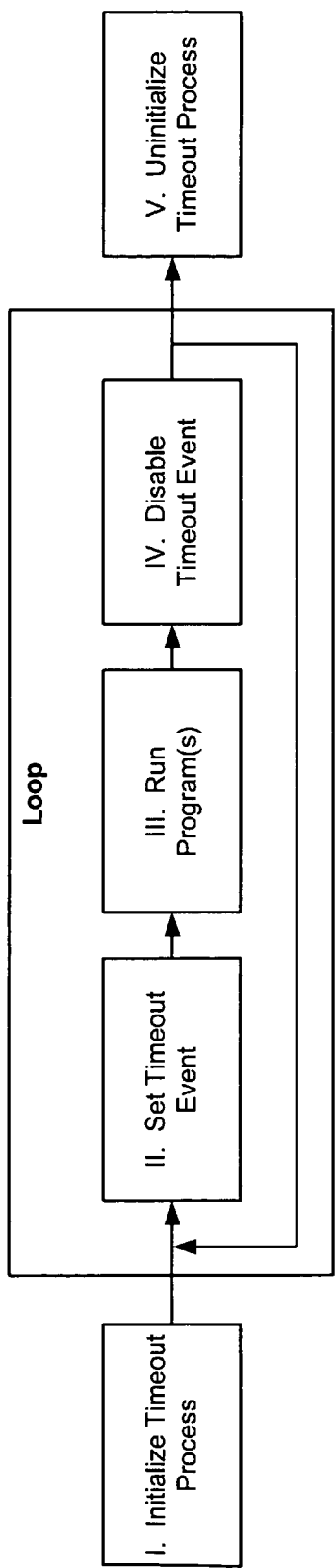
FIG. 7 illustrates process flow of timed execution, according to one embodiment.

FIG. 7—High Level Example of Time-Bound Program Execution

FIG. 7 is a high level block diagram illustrating time-bound program execution. Note that in this embodiment, the block labeled "Initialize Timed Execution" refers to initiating the timeout process described above, the block labeled "Start Timed Execution" refers to setting the timeout event, the block labeled "Stop Timed Execution" refers to disabling the timeout event, and the block labeled "Un-initialize Timed Execution" refers to terminating the timeout process. In one embodiment, the initiation and termination of the timed program execution process described above may occur prior to and after the block diagram, respectively.

In one embodiment, the time-bound program execution may be performed in the following way, where the process is presented in five stages (I-V):

I. Initialize Timed Execution
   a. Instantiate timeout mechanism.
   b. Preallocate all resources needed by the programs to run and initialize managers for these resources.

II. Start Timed Execution
   a. Enable the resource managers so that all request for resources are handled by them until the timed execution is stopped.
   b. Start the timeout mechanism.

III. Run Program(s)—for each individual program, do the following:
   a. If a timeout has occurred in a prior program, exit immediately.
   b. Store the state of resources handled by each resource manager.
   c. Establish a rollback state (e.g., a rollback point).
   d. Execute the program (as usual).
   e. If a rollback occurs:
      i. Restore the state of the resources handled by each resource manager.
      ii. Handle the error condition and exit the program.
   f. Otherwise, exit the program (as usual).

IV. Stop Timed Execution
   a. Stop the timeout mechanism.
   b. Disable the resource managers so that all requests for resources are handled as usual.

V. Un-initialize Timed Execution
  a. Free up the timeout mechanism.
  b. Free all resources controlled by the resource managers.

Thus, the above process may facilitate time-bounded execution of a program (or of a plurality of programs), and may also include performing initialization (I) and cleanup (V) operations related to the program execution.

Note that the above description is meant to be exemplary only, and is not intended to limit the method or process to any particular set of steps, or to any particular organization of steps. For example, in one embodiment, the above method may be performed in three stages: e.g., I+II, III, & IV+V. As another example, the indicated loop may not be required, although such loops are common in applications. As yet another example, if the programs to run do not require any dynamic system resources, then the following steps may not be required: I b., II a., III b., III e.sub.i., IV b., and V b.

Figure 8:
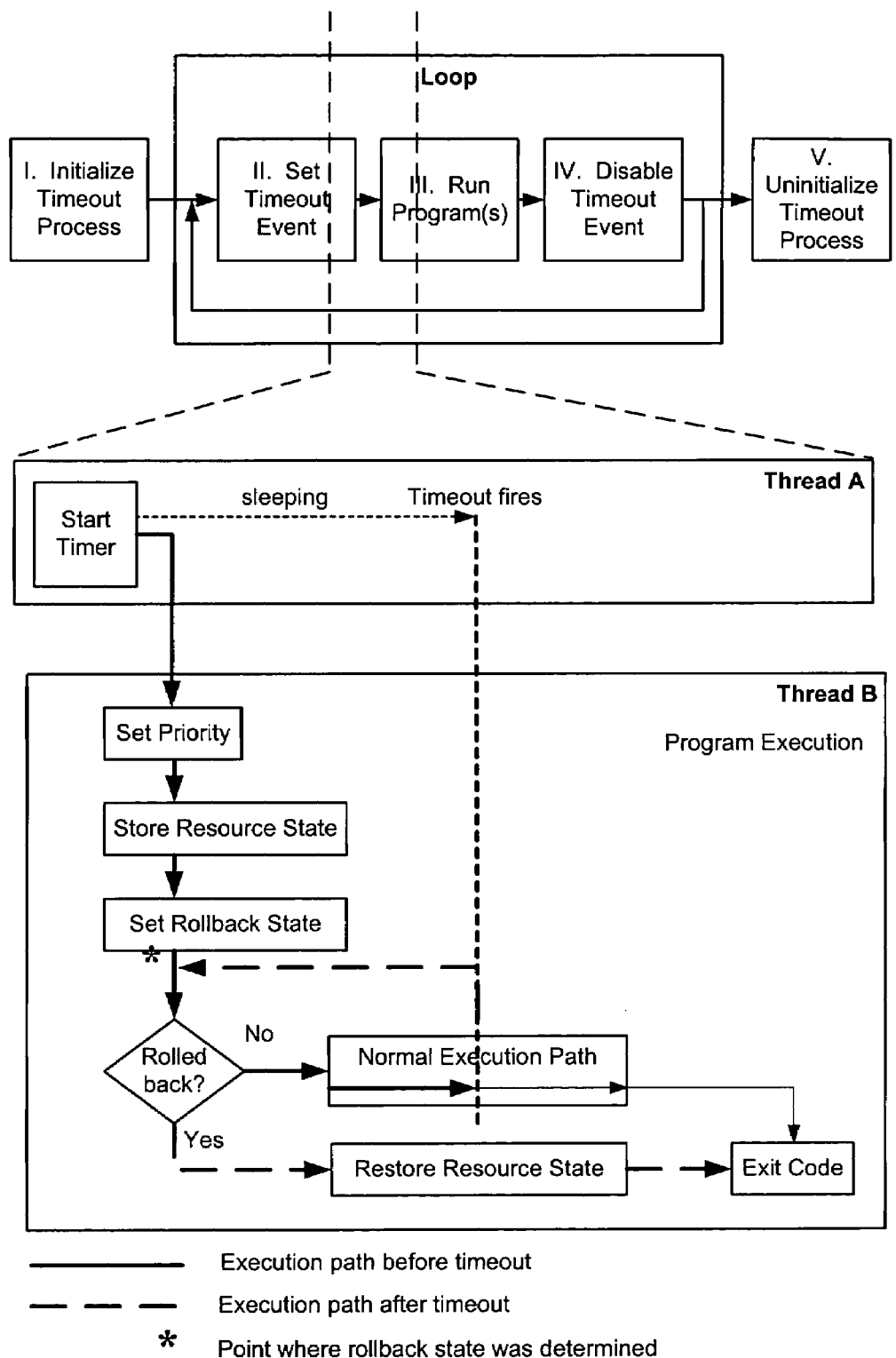
FIG. 8 illustrates a more detailed example of timeout behavior, according to one embodiment.

FIG. 8—Process Flow

FIG. 8 illustrates a high-level flow of the process of FIG. 7 from the start of the timer (the setting of the timeout event) through the program execution, including the recognition of a timeout event and subsequent exit. In a preferred embodiment, the process includes operations on two (or more) different execution threads, as described below.

As FIG. 8 shows, in one embodiment, a timeout mechanism may be initiated, e.g., a timer started, running in its own thread, e.g., Thread A, at time-critical priority. Once the timer is started, this thread may go to sleep, thereby allowing other process to run. Note that, as shown, the thread remains asleep until a timeout occurs or fires, described below.

As FIG. 8 also shows, a (timed) program execution process may begin executing in a separate thread, e.g., Thread B. As indicated by the Set Priority block, the priority of the thread is preferably set so that only the timeout mechanism can interrupt processing. In other words, as mentioned above, the priority level of Thread B is preferably set to just below that of Thread A, so that only Thread A can interrupt the processing of Thread B.

Then, as indicate by the Store Resource State block, required resource managers may be enabled and their current state stored in case a timeout occurs. In other words, any resources required by the program may have their respective state information saved so that in the case of a timeout, the resources may be reset to this state.

A rollback state (e.g., a rollback point) may then be set so that the program can be interrupted by the timeout mechanism, as indicated by the Set Rollback State block. Note that in FIG. 8, the point in the process just after the rollback state has been determined is marked with an asterisk (*), and is referred to in subsequent steps below.

A check may then be made as to whether a rollback has occurred, i.e., whether a timeout has occurred, as indicated by the "Rolled back" decision block. As shown, in this example, the initial timeout check is false (i.e., a rollback has not yet occurred) and the program begins normal processing, indicated by the thick solid line beginning at the far left of the Normal Execution Path block. In other words, a timeout has not occurred, and so the program begins execution.

As also indicated in this example, during program execution the timeout fires, waking up Thread A, and the following preferably occurs:

Thread A, the timeout mechanism, may take control of the processor because it has a higher process priority (set in the Set Priority block, described above) than Thread B. The timeout mechanism may update Thread B's execution state to restart processing from the location at which the rollback point was established (denoted by the asterisk (*) in FIG. 8), and the timeout mechanism may be reset to await another start operation. Note that in FIG. 8, bold solid arrows denote the execution path before the timeout occurs, and bold dashed arrows denote the execution path after the timeout occurs, where as shown, the timeout transition is illustrated in the Normal Execution Path block. Note also that the execution path for the case when no timeout occurs is shown as a thin solid line proceeding through the Normal Execution Path block to the Exit Code block.

Thus, the program (Thread B) may regain control of the processor but continue processing from a previous execution point (*). As shown, the method again checks whether rollback has occurred, which in this example is true because the timeout has occurred. The method may then restore the state of resources to reflect the resource state prior to running the program, indicated by the Restore Resource State block. Finally, the program may exit, e.g., with an error (timeout) condition.

As mentioned above with reference to FIG. 7, the management of resources (i.e., the Store Resource State block and the Restore Resource State block) may not be required by all programs and so may be considered optional steps. In one embodiment, the state of the resources may simply be a valid/invalid condition where storing the state insures the resources are valid and the restoring of the state invalidates the resources. However, in a preferred embodiment, the method may actually maintain valid resources so that they are never in an invalid (unusable) state.

In one embodiment, several rollback states (e.g., rollback points) may be established during the program processing to insure safe exiting in case a timeout occurs. For example, in one embodiment up to three rollback points may be utilized per program to properly manage timeouts. Of course, the number of rollback points or states used may be smaller or greater than three, as needed.

Detailed Embodiment of the Process of FIG. 8

An example embodiment of the process of FIG. 8 is described below in terms of pseudo code. It should be noted that the example shown is intended to be exemplary only, and is not intended to limit the invention to any particular implementation, form, or functionality.

The following pseudo code represents one embodiment of a set of functions that may be invoked from an application program to provide time-bounded execution functionality.

```
routine InitTimedExec[ ]
   print 'In InitTimedExec'
   CreateTimeoutThread[ ] # creates Thread A
   CreateResourceManagers[ ]
end
routine StartTimedExec[time]
   print 'In StartTimedExec'
   EnableResources[ ]
   SetTimeout[time] # calls Thread A
end
routine StopTimedExec[ ]
   print 'In StopTimedExec'
   ClearTimeout[ ]
   DisableResources[ ]
end
routine UninitTimedExec[ ]
   print 'In UninitTimedExec'
   DestroyTimeoutThread[ ]
   DestroyResourceManagers[ ]
```

```
                    end
                routine RunPrograms[ ]
                    print 'In RunPrograms'
                    print ' - Setup Rollback'
                    ReduceThreadPriority[ ]
                    StoreResourceState[ ]
                    SetRollbackPoint[ ]
                    print ' - Check Timeout Condition'
                    if Timeout occurred
                        print ' * Timeout occurred!'
                        RestoreResourceState[ ]
                        goto QUICK_EXIT
                    end
                    print ' - Normal Execution Path'
                    print ' - Algo1'
                    Algo1[ ]
                    print ' - Algo2'
                    Algo2[ ]
                    print ' - Algo3'
                    Algo3[ ]
                    print ' - Normal Exit'
                QUICK_EXIT
                    print 'Leaving RunPrograms'
                    exit
                end
```

The following is an example pseudo code application program that calls the above functions to perform three algorithms, (Algo1, Algo2, and Algo3) in a timed execution fashion. Example program execution paths for various timeout conditions are provided below.

```
            program TimeoutExample N
                print '--> Timeout Example in Thread B'
                call InitTimedExec
                call StartTimedExec, N
                call RunPrograms
                call StopTimedExec
                call UninitTimedExec
                print '<--'
            end
```

The following is an example execution path for the example pseudo code application program where a timeout (at 100 ms) occurs between Algo2 and Algo3 in RunPrograms.

```
                        >run TimeoutExample 100
                        --> Timeout Example in Thread B
                        In InitTimedExec
                        In StartTimedExec
                        In RunPrograms
                         - Setup Rollback
                         - Check Timeout Condition
                         - Normal Execution Path
                         - Algo1
                         - Algo2
                         - Check Timeout Condition
                         * Timeout occurred!
                        Leaving RunPrograms
                        In StopTimedExec
                        In UninitTimedExec
                        <--
```

Thus, when the timeout occurs, program execution may be interrupted, preventing Algo3 from being performed. The program may be reset to the determined rollback state (e.g., to the rollback point), and execution resumed with a timeout condition, in response to which the program may exit normally.

The following is an example execution path for the example pseudo code application program where a timeout limit of 1000 ms (1000 ms=1s) allows RunPrograms to complete execution normally.

```
                        >run TimeoutExample 1000
                        --> Timeout Example in Thread B
                        In InitTimedExec
                        In StartTimedExec
                        In RunPrograms
                         - Setup Rollback
                         - Check Timeout Condition
                         - Normal Execution Path
                         - Algo1
                         - Algo2
                         - Algo3
                         - Normal Exit
                        Leaving RunPrograms
                        In StopTimedExec
                        In UninitTimedExec
                        <--
```

Note that, as described above, the timeout example program runs in Thread B at critical priority. When SetTimeout is called in StartTimedExec, control is passed to Thread A (also at critical priority) to set the timeout event, then Thread A goes to sleep, returning control back to Thread B. Note that when RunPrograms starts, Thread B's priority is reduced, allowing Thread A to interrupt when awakened by the timeout event. In case of a timeout, Thread A rolls back Thread B's execution and returns to a sleep state, allowing Thread B to resume control at the new execution point (the determined rollback point).

Figure 9:
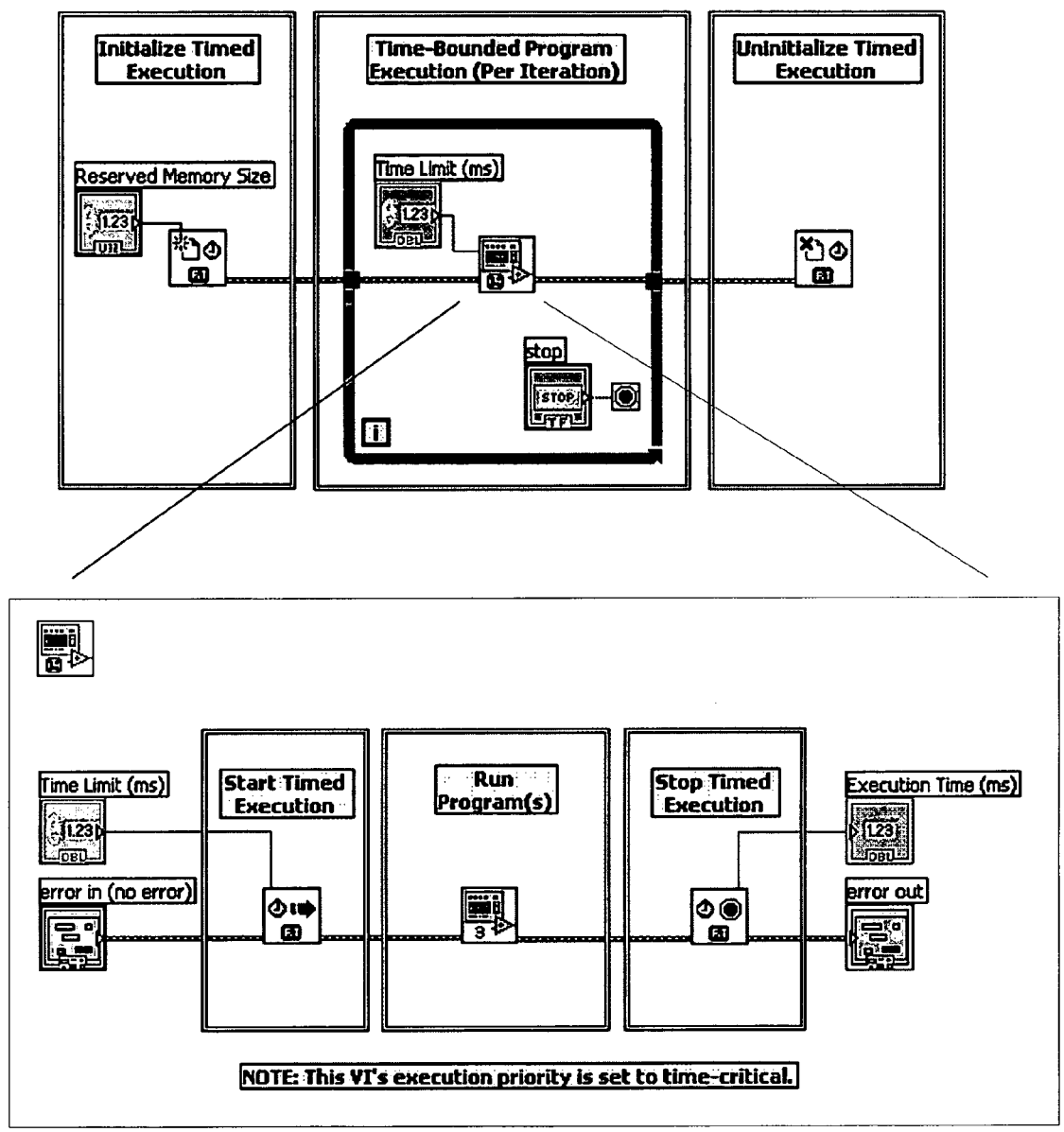
FIG. 9 illustrates an example implementation of the methods of FIGS. 6A-6C, according to one embodiment.

It should be noted that the above functions (or substantial equivalents) and programs may be implemented as, and/or invoked from, graphical programs, as illustrated in FIG. 9, described below.

Implementation of Time Bounded Program Execution

Various embodiments of the techniques described herein may thus allow existing code to be time-bounded with minimal changes focusing primarily on resource usage. If the code is written using standard coding practices, the necessary changes may be localized. For example, if memory allocations are performed via user-defined allocate/deallocate functions (e.g., perhaps only wrappers around base allocate/deallocate functions), then updating those functions to use a resource manager may protect all dynamic allocations requested in the code. By eliminating resource requests from the system, the deterministic behavior of the code may thus be improved. In many cases, a wrapper function may be all that is needed to time-bound an algorithm, especially if all workspace buffers are passed as inputs or no internal allocations are needed.

The traditional way to 'port' an algorithm to a deterministic environment typically involves redesigning the routine to produce results iteratively, which is not always efficient or feasible for many complex algorithms. For example, fast pattern matching algorithms often use a form of sub-sampling to characterize a search template. Due to the 2-dimensional nature of the problem, this type of sampling is inherently non-linear, making point-by-point scanning inefficient in history accumulation (i.e. for determining possible locales for further inspection). Often the samples are normalized to remove variations in lighting, making point-by-point decisions impossible. Using embodiments of the techniques disclosed herein, these constraints may not apply and so a much larger set of algorithms may be considered time-boundable.

FIG. 9—Example Implementation

FIG. 9 illustrates time-bounded execution in a LabVIEW application, according to one embodiment. More specifically, FIG. 9 illustrates an embodiment of the present invention where the program and the time-bounded execution process are implemented in graphical program code, specifically, as LabVIEW graphical programs. It should be noted that the particular implementation of FIG. 9 is intended to be exemplary only, and is not intended to limit the form, function, or appearance, of the invention to any particular implementation. In other words, the time-bounded program execution techniques described herein are considered to be broadly applicable to any process where a program (text-based or graphical) is required to execute in a time-bounded manner.

As FIG. 9 shows, a top-level graphical program may include an Initialize Time Execution portion, a Time-Bounded Program Execution portion, and an Uninitialize Time Execution portion. Note that the Time-Bounded Program Execution portion of the graphical program includes a loop structure for iteratively performing the program in a time-bounded manner, e.g., once per item on an assembly line.

As FIG. 9 also shows, the Time-Bounded Program Execution portion includes a graphical program node (with an icon representing a clock and an instrument interface) that is itself a graphical program, shown "expanded" in the bottom section of FIG. 9. As shown, the expanded graphical program may include a Start Timed Execution section, a Run Program(s) section, and a Stop Timed Execution section, as well as various node providing input and output for the sections. Additionally, the 'Run Program(s)' section preferably includes a program node (or a collection of program nodes), also referred to as a virtual instrument (VI) (or collection of VIs) whose processing time is to be limited. In other words, the graphical program node shown in the Run Program(s) section comprises the program whose execution is to be time-bounded. Please refer to FIGS. 7 and 8, described above, for further details of each section.

Example: Machine Vision

For an example in the machine vision domain, consider an application needed to inspect the number of surface imperfections in a camera lens. Given a digital image of the lens, this type of inspection may achieved by counting the number of blobs in an image of the lens. For example, in IMAQ Vision 7, a machine vision application provided by National Instruments Corporation, this processing may be performed using an IMAQ Particle Analysis VI. Under normal circumstances, a camera lens should have at most 10-15 detectable blemishes and hence should contain no more than 15 blobs. Assume the execution time to process the digital image of an acceptable camera lens is roughly 5 ms (milliseconds). However, the image of a bad lens having 100 or more surface problems may cause the blob inspection's execution time to jump as much as 10+times (or >50 ms for this example), and thus, time-bounded program execution may be desirable.

Using the above infrastructure (of FIG. 9), the 'Time Limit (ms)' input may be set to a value of approximately 10 ms. This time limit may allow for some variation in performance but may avoid spending excessive amounts of time processing images of bad lenses (with many blemishes). In this example, the VI in the 'Run Program(s)' section may be replaced by the IMAQ Particle Analysis VI (or equivalent), and a trivial check made to see if this VI process (a) timed out, or (b) found more than 15 blobs. If either of these conditions is true, a failure condition may be returned from the VI, e.g., via an "Error Out" node, as shown. Note that in this example, a node is provided indicating the Execution Time in milliseconds.

Example: Numerical Analysis

The numerical analysis domain can provide another specific example. Consider a numerical optimization process where determination of a minimum value of a function is required. Many optimization routines are based on iterative processes. If the optimization routine is to be interrupted before its result conditions/tolerances are met, an additional callback mechanism is typically required to allow the user to define other states in which the optimization may exit. This mechanism must generally be built-in to the optimization routine at design time. The use of this mechanism is usually driven by the need to limit the execution time of the optimization. Classes of functions that behave well for a specific optimization approach require roughly the same number of iterations to converge and hence take roughly the same amount of time to compute (if the time to evaluate the function is similar). Functions not suited for this type of optimization may require a much larger number of iterations and thus generally exceed desired execution times. However, limiting iterations punishes functions that evaluate quickly but have slower convergence, and so this approach may introduce undesired biases.

The above infrastructure may be used to solve this type of problem in numeric optimization. As with the blob analysis example, an optimization VI may replace the VI in the 'Run Program(s)' section. The 'Time Limit (ms)' input should be set to the maximum amount of time the application permits for one optimization to take place. In one embodiment, this limit may be scaled in accordance with the time required by the function to be evaluated so that optimizing more complex functions may be allowed more time. Code performing this scaling may be placed in the loop of the Time-Bounded Program Execution (Per Iteration) section of the graphical program. The scaled time limit may then be passed to the time-bounded VI containing the optimization VI.

Thus, the numerical optimization process may be embedded or included in the time-bounded program execution infrastructure shown in FIG. 9, and may thus be constrained to execute within specified time limits.

It should be noted that the examples described above are exemplary only, and that various embodiments of the present invention are contemplated for use in any type of application domain, system, or process where program execution is to be performed in a time-bounded manner.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A computer-accessible memory medium that stores program instructions for performing time-bounded execution of a program, wherein the program instructions are executable by a processor to perform:

1) initiating a timed program execution process, wherein the timed program execution process is configured to execute a program in a time-bounded manner;

2) initiating a timeout process, wherein the timeout process is configured to preempt the execution process to interrupt execution of the program;

3) configuring a timeout event, wherein the timeout event is an event indicating a timeout condition for the program;
4) the timed program execution process performing a time-bounded execution of the program, comprising:
   a) determining and storing a rollback state for the program;
   b) if the timeout event has not occurred, executing the program, wherein, during said executing, if the timeout event occurs,
      c) the timeout process setting the timed program execution process to the rollback state, and disabling the timeout event; and
      d) the timed program execution process resuming executing the program based on the rollback state with a timeout condition in preparation to perform a program exit procedure; and
   e) performing the program exit procedure, thereby terminating execution of the program;
5) disabling the timeout event;
6) terminating the timeout process; and
7) terminating the timed program execution process.

2. The memory medium of claim 1, wherein e) further comprises:
   clearing the rollback state.

3. The memory medium of claim 2, wherein the program instructions are further executable to perform:
   iteratively performing said time-bounded execution of a plurality of programs.

4. The memory medium of claim 3, wherein said iteratively performing comprises:
   for each of the plurality of programs, performing a) through e).

5. The memory medium of claim 4, wherein e) further comprises:
   if the timeout event has occurred, storing an indication of a timeout condition; and
   wherein the timed program execution process performing a time-bounded execution of the program comprises:
   performing a) through e) if the timeout condition is not indicated.

6. The memory medium of claim 2, wherein the program instructions are further executable to iteratively perform:
   setting a timeout event;
   the timed program execution process performing a time-bounded execution of the program; and
   disabling the timeout event.

7. The memory medium of claim 2, wherein the timeout process executes at a first priority level, and wherein the program instructions are further executable to perform:
   setting an execution priority level of the timed program execution process to a second priority level, wherein the second priority level is below the first priority level.

8. The memory medium of claim 7, wherein said performing a time-bounded execution of the program further comprises:
   storing an original execution priority level of the timed program execution process prior to said setting the execution priority level of the timed program execution process; and
   wherein e) further comprises:
   restoring the execution priority level of the timed program execution process to the original execution priority level.

9. The memory medium of claim 2,
wherein said initiating the timeout process comprises:
   acquiring one or more resources for the time-bounded execution of the program; and
   initializing one or more resource managers for the one or more resources; and
wherein said terminating the timeout process comprises:
   releasing the one or more resources for the time-bounded execution of the program; and
   un-initializing the one or more resource managers for the one or more resources.

10. The memory medium of claim 9,
wherein said initiating the timeout process further comprises:
   creating each of the one or more resource managers; and
wherein said terminating the timeout process further comprises:
   deleting each of the one or more resource managers.

11. The memory medium of claim 9,
wherein said initiating the timeout process further comprises:
   enabling each of the one or more resource managers; and
wherein said terminating the timeout process further comprises:
   disabling each of the one or more resource managers.

12. The memory medium of claim 9, wherein said one or more resources comprises:
   one or more memory pools for memory allocations during the time-bounded execution of the program.

13. The memory medium of claim 9,
wherein, prior to a), the program instructions are farther executable to perform:
   storing a respective resource state for each of the one or more resources; and
   enabling each of the one or more resource managers,
wherein e) further comprises:
   if the timeout event has occurred,
   restoring the respective resource state for each of the one or more resources; and
   disabling each of the one or more resource managers.

14. The memory medium of claim 1, wherein said initiating the timeout process is performed during said executing.

15. The memory medium of claim 1,
wherein the program comprises one or more sub-programs; and
wherein b) further comprises:
   performing a) through e) for each of the one or more sub-programs.

16. The memory medium of claim 1, wherein said initiating the timeout process is performed by the timed program execution process.

17. The memory medium of claim 1, wherein the rollback state comprises:
   a rollback point, comprising an execution point in the program, and
   an execution state of the timed program execution process at the rollback point.

18. The memory medium of claim 1, wherein the program comprises a subprogram, and wherein said executing the program further comprises:
   8) initiating another timeout process;
   9) configuring another timeout event;
   10) the timed program execution process performing a time-bounded execution of the subprogram, comprising:
      f) determining and storing another rollback state for the subprogram;
      g) if the another timeout event has not occurred, executing the subprogram, wherein, during said executing the subprogram, if the another timeout event occurs, h) the another timeout process setting the timed program execution process to the another rollback state, and disabling the another timeout event; and
i) the timed program execution process resuming executing the subprogram based on the another rollback state with another timeout condition; and
j) performing a subprogram exit procedure, thereby terminating execution of the subprogram;

11) disabling the another timeout event; and
12) terminating the another timeout process.

19. The memory medium of claim 18, wherein j) further comprises e).

20. The memory medium of claim 1, wherein the program instructions are further executable to perform time-bounded execution of another program substantially in parallel with the time-bounded execution of the program by:
    8) initiating another timeout process;
    9) configuring another timeout event;
    10) the timed program execution process performing a time-bounded execution of the another program, comprising:
        f) determining and storing another rollback state for the another program;
        g) if the another timeout event has not occurred, executing the another program, wherein, during said executing the another program, if the another timeout event occurs,
        h) the another timeout process setting the timed program execution process to the another rollback state, and disabling the another timeout event; and
        i) the timed program execution process resuming executing the another program based on the another rollback state with another timeout condition; and
        j) performing another program exit procedure, thereby terminating execution of the other program;
    11) disabling the another timeout event; and
    12) terminating the another timeout process.

21. The memory medium of claim 1, wherein said executing the program further comprises:
    receiving a disable request from the program to disable the rollback state;
    disabling the rollback state in response to said disable request;
    receiving an enable request from the program to enable the rollback state;
    enabling the rollback state in response to said enable request; and
    updating the rollback state for the program.

22. The memory medium of claim 1, wherein the program comprises a machine vision application.

23. The memory medium of claim 1, wherein the program comprises a numerical analysis application.

24. The memory medium of claim 1, wherein the program comprises a text-based program.

25. The memory medium of claim 1, wherein the program comprises a graphical program.

26. A system for performing time-bounded execution of a program, wherein the system comprises:
    a processor; and
    a memory coupled to the processor, wherein the memory stores program instructions executable by the processor to:
        1) initiate a timed program execution process, wherein the timed program execution process is configured to execute a program in a time-bounded manner;
        2) initiate a timeout process, wherein the timeout process is configured to preempt the execution process to interrupt execution of the program;
        3) set a timeout event, wherein the timeout event is an event indicating a timeout condition for the program;
    wherein the timed program execution process is configured to:
        4) perform a time-bounded execution of the program, wherein, in performing the time-bounded execution, the timed program execution process is configured to:
            a) determine and store a rollback state for the program;
            b) if the timeout event has not occurred, execute the program, wherein, during said executing, if the timeout event occurs,
            c) the timeout process is configured to set the timed program execution process to the rollback state, and disable the timeout event; and
            d) the timed program execution process is configured to resume executing the program based on the rollback state with a timeout condition in preparation to perform a program exit procedure; and
            e) perform the program exit procedure, thereby terminating execution of the program;
    wherein the program instructions are further executable by the processor to:
        5) disable the timeout event;
        6) terminate the timeout process; and
        7) terminate the timed program execution process.

27. A computer system for performing time-bounded execution of a program, comprising:
    1) means for initiating a timed program execution process, wherein the timed program execution process is configured to execute a program in a time-bounded manner;
    2) means for initiating a timeout process, wherein the timeout process is configured to preempt the execution process to interrupt execution of the program;
    3) means for setting a timeout event, wherein the timeout event is an event indicating a timeout condition for the program;
    4) means for the timed program execution process performing a time-bounded execution of the program, comprising:
        a) means for determining and storing a rollback state for the program;
        b) means for: executing the program if the timeout event has not occurred, wherein, during said executing, if the timeout event occurs,
        c) the timeout process setting the timed program execution process to the rollback state, and disabling the timeout event; and
        d) the timed program execution process resuming executing the program based on the rollback state with a timeout condition in preparation to perform a program exit procedure; and
        e) means for performing the program exit procedure to terminate execution of the program;
    5) means for disabling the timeout event;
    6) means for terminating the timeout process; and
    7) means for terminating the timed program execution process.

* * * * *